United States Patent
Lee

(10) Patent No.: US 8,120,817 B2
(45) Date of Patent: Feb. 21, 2012

(54) REVISING HALFTONE IMAGE BY ADDING DOT TO OR FILTERING EDGE PIXEL

(75) Inventor: Hae-kee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 777 days.

(21) Appl. No.: 12/184,356

(22) Filed: Aug. 1, 2008

(65) Prior Publication Data

US 2009/0219578 A1 Sep. 3, 2009

(30) Foreign Application Priority Data

Feb. 29, 2008 (KR) ........................ 10-2008-0019215

(51) Int. Cl.
*H04N 1/409* (2006.01)
*G06T 5/00* (2006.01)
(52) U.S. Cl. ...................... 358/3.27; 382/266
(58) Field of Classification Search ................ 358/1.9, 358/3.06, 3.07, 3.15, 3.2, 3.21, 3.27, 447, 358/448, 462, 464; 382/195, 199, 254, 258, 382/260, 261, 266, 269, 270
See application file for complete search history.

(56) References Cited

U.S. PATENT DOCUMENTS

| | | | | | |
|---|---|---|---|---|---|
| 4,611,349 | A | * | 9/1986 | Hou | 382/269 |
| 4,885,786 | A | * | 12/1989 | Anderson et al. | 358/451 |
| 5,231,519 | A | * | 7/1993 | Koike | 358/3.07 |
| 5,886,797 | A | * | 3/1999 | Shimura | 382/266 |
| 7,116,447 | B2 | * | 10/2006 | Braun et al. | 358/3.15 |
| 7,164,795 | B2 | * | 1/2007 | Ohara et al. | 382/199 |
| 2006/0256385 | A1 | * | 11/2006 | Takebe et al. | 358/3.06 |
| 2008/0309951 | A1 | * | 12/2008 | Kishi et al. | 358/1.2 |
| 2010/0158404 | A1 | * | 6/2010 | Mathew et al. | 382/257 |
| 2010/0177980 | A1 | * | 7/2010 | Bajo et al. | 382/257 |
| 2010/0239173 | A1 | * | 9/2010 | Yamada et al. | 382/266 |

FOREIGN PATENT DOCUMENTS

| | | | | |
|---|---|---|---|---|
| JP | 2002152511 A | * | 5/2002 | |
| JP | 2010232858 A | * | 10/2010 | |
| KR | 1992-6900 | | 4/1992 | |
| KR | 2005-75542 | | 7/2005 | |

* cited by examiner

*Primary Examiner* — Scott A Rogers
(74) *Attorney, Agent, or Firm* — Stanzione & Kim, LLP

(57) ABSTRACT

A halftone revision apparatus includes a screening unit to screen an input image, and a revision unit to detect edge pixels in the input image, and to add a dot to a detected edge pixel according to a number of white pixels adjacent to the detected edge pixel. Therefore, edges in the halftoned image can be improved.

21 Claims, 9 Drawing Sheets

REVISING HALFTONE IMAGE BY ADDING DOT TO OR FILTERING EDGE PIXEL

CROSS-REFERENCE TO RELATED APPLICATIONS

This application claims priority under 35 U.S.C. §119 (a) from Korean Patent Application No. 10-2008-0019215, filed on Feb. 29, 2008, in the Korean Intellectual Property Office, the disclosure of which is incorporated herein by reference in its entirety.

BACKGROUND OF THE INVENTION

1. Field of the Invention

The present general inventive concept relates to an apparatus and method to revise a halftone image, and an image forming apparatus using the same. More particularly, the present general inventive concept relates to an apparatus and method to revise an edge of a halftone image, and an image forming apparatus using the same.

2. Description of the Related Art

Image forming apparatuses express images using binary values indicating whether a dot is printed, unlike image apparatuses, which express images using a multiple levels.

Therefore, image forming apparatuses convert an image expressed with multi-level values into an image expressed with binary values. This is called halftoning.

There are a wide range of halftoning methods, the most widely used of which is screening halftoning, which performs binary coding by comparing a gradation value of a pixel to be binary-coded ranging from 0 to 255 with a preset screen.

A screen may be either an amplitude-modulated (AM) screen or a frequency-modulated (FM) screen according to the method for constituting dots. An AM screen outputs dots in clusters, so dots can be output more securely than in an FM screen. For this reason, an AM screen is also referred to as a clustered screen, and is used for most image forming apparatuses.

In general, in an AM screen, an image with a low number of lines per inch (LPI) may be printed smoothly due to high dot representation but detailed printing is more difficult. An image with a high number of lines per inch (LPI) is able to be printed in greater detail, but smooth printing is more difficult.

Due to halftoning, edges of a the printed image may be rough.

SUMMARY OF THE INVENTION

The present general inventive concept provides an apparatus and method to revise a halftone image, and an image forming apparatus using the same, such that edges of an image can be improved by adding dots to a screened image according to a number of white pixels adjacent to an edge pixel.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a halftone revision apparatus including a screening unit to screen an input image, and a revision unit to detect edge pixels in the input image, and to add a dot to a detected edge pixel according to a number of white pixels adjacent to the detected edge pixel.

The revision unit may include an edge determination unit to detect the edge pixels in the input image, and to determine an edge direction of the detected edge pixel, a filter unit to output a filtering value corresponding to a number of white pixels adjacent to the edge pixel by applying a filtering pattern corresponding to screening information of the screening unit and the edge direction to the edge pixel, and a control unit to add the dot to the edge pixel according to the filtering value.

The control unit may compare the filtering value of the filter unit with a preset reference value, and if the filtering value is higher than the reference value, add the dot to a location to which the filtering pattern is currently applied.

The control unit may compare the filtering value of the filter unit with a preset reference value, and if the filtering value is lower than the reference value, output a pixel value corresponding to the edge pixel.

The reference value may be determined according to a pixel density of the input image and a slant of the edge pixels.

The control unit may determine a pixel density of the added dot according to whether a background of the edge pixel is white, and an edge direction.

The screening information may include a line-per-inch (LPI) value and an angle of a screen.

The foregoing and/or other aspects and utilities of the present general inventive concept may be achieved by providing a halftone revision method including screening an input image, and detecting edge pixels in the input image, and adding a dot to a detected edge pixel according to a number of white pixels adjacent to the detected edge pixel.

The detecting and adding operation may include detecting the edge pixels in the input image, and determining an edge direction of the detected edge pixel, outputting a filtering value corresponding to a number of white pixels adjacent to the edge pixel by applying a filtering pattern corresponding to screening information and the edge direction to the edge pixel, and adding the dot to the edge pixel according to the filtering value.

In the adding operation, the filtering value may be compared with a preset reference value, and if the filtering value is higher than the reference value, the dot may be added to a location to which the filtering pattern is currently applied.

In the adding operation, the filtering value may be compared with a preset reference value, and if the filtering value is lower than the reference value, the pixel value corresponding to the edge pixel may be output.

The reference value may be determined according to a pixel density of the input image and a slant of the edge pixels.

The pixel density of the added dot may be determined according to whether a background of the edge pixel is white, and an edge direction.

The screening information may include a lines-per-inch (LPI) value and an angle of a screen.

The foregoing and/or other aspects and utilities of the present general inventive concept may also be achieved by providing a halftone revision method including determining a filtering pattern corresponding to screening information of an input image and an edge direction in the input image, and performing filtering by applying the filtering pattern to an edge pixel in the input image.

The screening information may include a lines-per-inch (LPI) value and an angle of a screen, and in the determining operation, a triangular filtering pattern may be determined, which is inversely proportional to the LPI value and in which two sides form an angle corresponding to the angle, and one vertex is in the direction of the edge direction.

The halftone revision method may further include adding a dot to the edge pixel according to the filtering result.

The foregoing and/or other aspects and utilities of the present general inventive concept may also be achieved by providing an image forming apparatus including an image processing unit to screen an input image and to add a dot to an edge area of the screened input image, and a printing unit to print the image having the edge area to which the dot is added.

The image processing unit may include an edge determination unit to detect edge pixels constituting the edge area of the input image, and to determine an edge direction of the detected edge pixel, a filter unit to output a filtering value corresponding to a number of white pixels adjacent to the edge pixel by applying a filtering pattern corresponding to screening information of the screening unit and the edge direction to the edge pixel, and a control unit to add the dot to the edge pixel according to the filtering value.

The screening information may include a lines-per-inch (LPI) value and an angle of a screen.

The foregoing and/or other aspects and utilities of the general inventive concept may also be achieved by providing a computer-readable recording medium having embodied thereon a computer program to execute a method, wherein the method including screening an input image, and detecting edge pixels in the input image, and adding a dot to a detected edge pixel according to a number of white pixels adjacent to the detected edge pixel.

BRIEF DESCRIPTION OF THE DRAWINGS

These and/or other aspects and utilities of the present general inventive will become apparent and more readily appreciated from the following description of the embodiments, taken in conjunction with the accompanying drawings, of which.

DETAILED DESCRIPTION OF THE PREFERRED EMBODIMENTS

Figure 1:
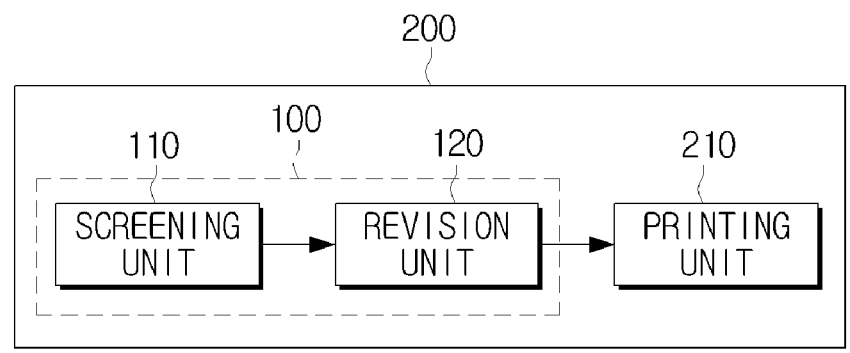
FIG. 1 is a block diagram illustrating a configuration of an image forming apparatus according to an exemplary embodiment of the present general inventive concept.

Reference will now be made in detail to present embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating a configuration of an image forming apparatus according to an exemplary embodiment of the present general inventive concept. As illustrated in FIG. 1, the image forming apparatus 200 includes an image processing unit 100 and a printing unit 210. The image processing unit 100 may be implemented as a halftone revision apparatus including a screening unit 110 and a revision unit 120.

The screening unit 110 performs halftoning of an input image. Halftoning expresses brightness of an image using dots. Among various possible screening methods, clustered screening is used in this exemplary embodiment.

The screening unit 110 compares a gradation value of a pixel to be binary-coded ranging from 0 to 255 with a preset screen, performs binary coding to convert the pixel into 1 bit (0 or 1). The screening unit 110 can perform 2 bit or 4 bit conversion as well as 1 bit conversion.

The revision unit 120 performs halftone revision only in an edge area of the input image. More specifically, edge pixels constituting the edge area are detected, and revision is performed by adding a dot to a detected edge pixel according to a number of white pixels adjacent to the edge pixel.

The printing unit 210 prints the image including the edge area having added dots, so the edge area of the image can be expressed more smoothly.

Figure 2:
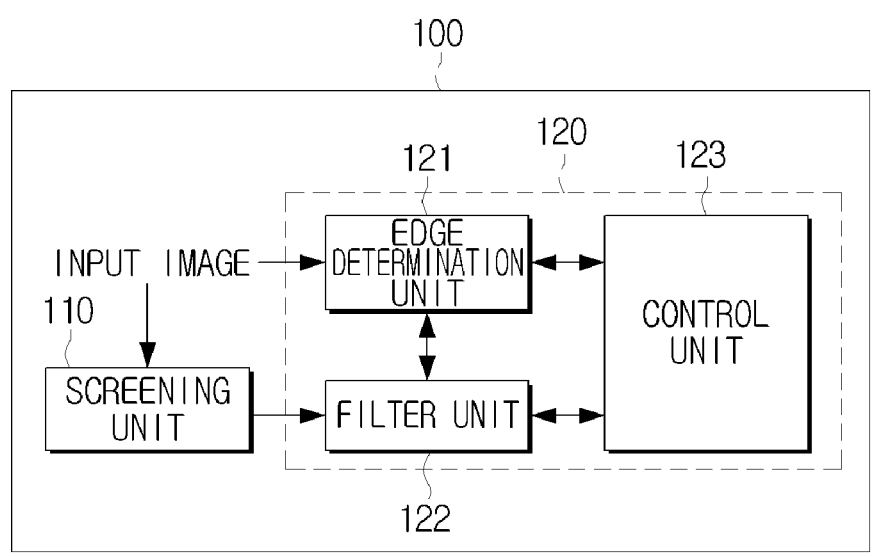
FIG. 2 is a block diagram illustrating a configuration of a halftone revision apparatus according to an exemplary embodiment of the present general inventive concept.

FIG. 2 is a block diagram illustrating a configuration of a halftone revision apparatus according to an exemplary embodiment of the present general inventive concept. As illustrated in FIG. 2, the halftone revision apparatus 100 includes a screening unit 110, and a revision unit 120, which includes an edge determination unit 121, a filter unit 122, and a control unit 123.

The halftone revision apparatus 100 may be applied to the image forming apparatus 200 as illustrated in the exemplary embodiment of FIG. 1, or applied to a host device in which a printer driver program is installed.

The image processing unit 100 of the image forming apparatus 200 of FIG. 1 may be implemented using the same configuration as the halftone revision apparatus 100 of FIG. 2, so the same reference numerals refer to the same elements. The screening unit 110 has the same function as that in FIG. 1.

The edge determination unit 121 detects edge pixels in an edge area of an input image. Edge pixels can be detected by generating a blurring gray image of the input image using a Gaussian filter, and calculating the generated gray image using a Sobel mask. Since detecting edges using a Sobel mask is well-known to those skilled in the art, detailed description is omitted here.

Furthermore, the edge determination unit 121 determines an edge direction of the detected edge pixel. An edge direction can be determined according to a density change direction of the edge pixel and a correlation direction of the edge pixel in respect to the input image. Detailed description thereof is given below with reference to FIG. 3.

Figure 3:
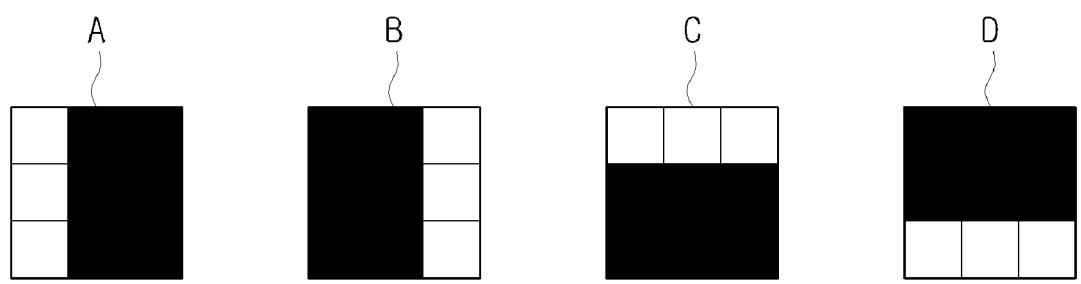
FIG. 3 illustrates edge directions according to an exemplary embodiment of the present general inventive concept.
Figure 3:
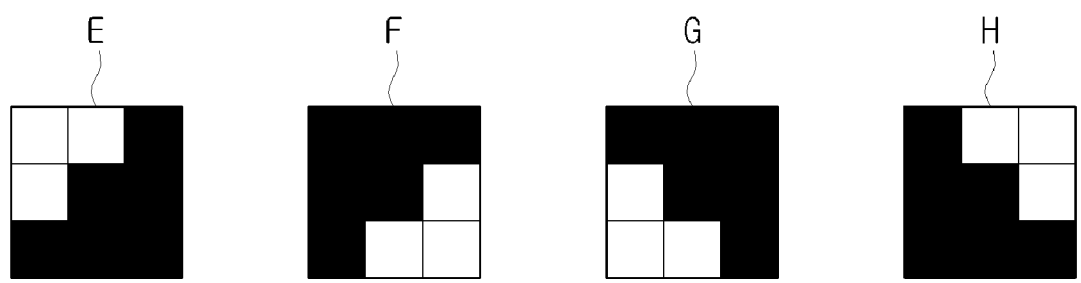

FIG. 3 illustrates edge directions according to an exemplary embodiment of the present general inventive concept. A density change direction of the edge pixel may be defined as a direction from a low density to a high density, or a direction from a high density to a low density. In FIG. 3, a density change direction is defined as a direction from a low density to a high density.

A correlation direction of the edge pixel with respect to the input image may be one of a horizontal direction, a vertical direction, and an oblique direction. An edge direction can be defined as follows, by combining the two types of directions.

TABLE 1

| Edge direction | Density change direction | Correlation direction |
|---|---|---|
| First direction (A) | → | Vertical direction |
| Second direction (B) | ← | Vertical direction |
| Third direction (C) | ↓ | Horizontal direction |
| Fourth direction (D) | ↑ | Horizontal direction |
| Fifth direction (E) | ↘ | Oblique direction |
| Sixth direction (F) | ↖ | Oblique direction |
| Seventh direction (G) | ↗ | Oblique direction |
| Eighth direction (H) | ↙ | Oblique direction |

Table 1 illustrates 8 edge directions A-H, but there may be more edge directions according to a slope of the edge pixels of the input image, and the pixel density.

The filter unit 122 determines a filtering pattern based on screening information from the screening unit 110 and the edge direction determined by the edge determination unit 121, and performs filtering by applying the determined filtering pattern to the edge pixels. The filter unit 122 can detect a filtering pattern corresponding to the screening information and the edge direction from among preset filtering patterns. Alternatively, the filter unit 122 can directly generate a filtering pattern taking into consideration the screening information and the edge direction of the input image.

The screening information may be an LPI value and the angle of the screen.

That is, the filter unit 122 includes a diverse range of filtering patterns according to an LPI value and an angle of the screen, and an edge direction, and adopts a filtering pattern suitable for a current edge pixel.

In greater detail, a filtering pattern may be inversely proportional to an LPI value, and may be a triangular filtering pattern in which two sides form an angle as large as the angle of the screen, and in which one vertex is in the direction of the edge direction.

The control unit 123 determines whether to add a dot to the edge area by comparing a filtering value of the filter unit 122 and a preset reference value.

An operation of the filter unit 122 and the control unit 123 is described with reference to FIGS. 4A and 5B.

Figure 4A:
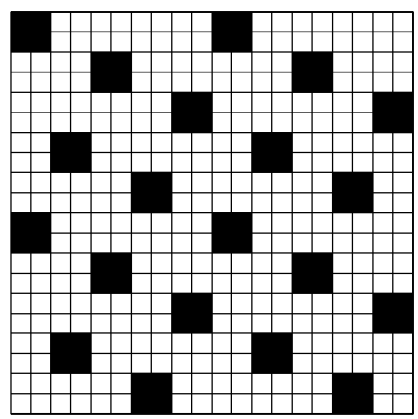
FIGS. 4A to 5B illustrate filtering patterns according to an exemplary embodiment of the present general inventive concept.
Figure 4B:
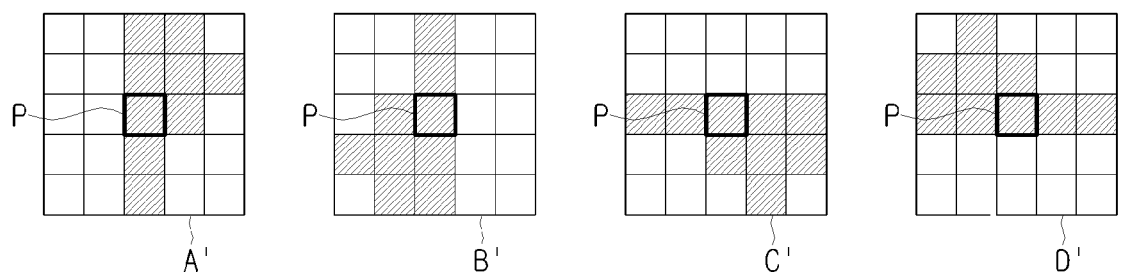
Figure 5A:
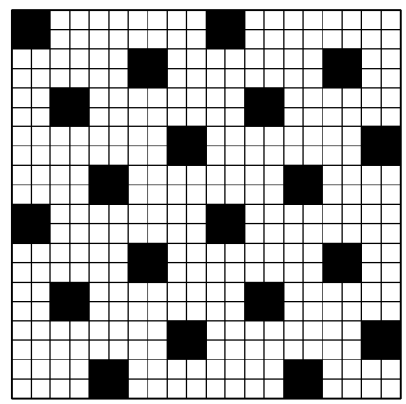
Figure 5B:
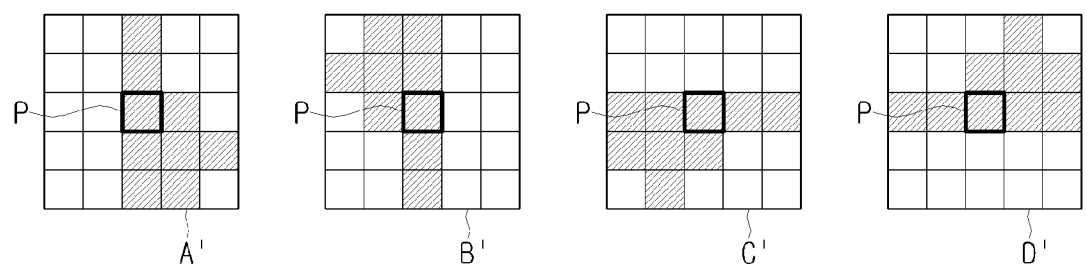

FIGS. 4A and 5B illustrate filtering patterns according to an exemplary embodiment of the present general inventive concept. FIG. 4A illustrates a screen having 134 LPI and 63° input angle. In addition, an edge direction is one of the first direction A to the fourth direction D in Table 1, and a filtering pattern applied to an edge pixel is illustrated in FIG. 4B.

In the filtering pattern, two sides of the triangular filtering pattern form an angle of approximately 63°, and the vertex which is not at one or an other end of the long side is in the direction of an edge direction. The size of the filtering pattern corresponds to the LPI value.

That is, if the edge direction is the first direction A, the first pattern A' is applied, if the edge direction is the second direction B, the second pattern B' is applied, if the edge direction is the third direction C, the third pattern C' is applied, and if the edge direction is the fourth direction D, the fourth pattern D' is applied. A location P is a location corresponding to an edge pixel detected by the edge determination unit 121, and whether to add a dot to the location P is determined according to the filtering results.

FIG. 5A illustrates a screen having 134 LPI and 27° input. An edge direction is one of the first direction A to the fourth direction D in Table 1, and a filtering pattern applied to an edge pixel is illustrated one of the first pattern A' to the fourth pattern D' in FIG. 5B.

In the filtering pattern, two sides of the triangular filtering pattern form an angle of approximately 27°, and the vertex which is not at one or other end of the long side is in the direction of an edge direction. The size of the filtering pattern corresponds to the LPI value, and is the same in FIGS. 5B and 4B, resulting in different filtering patterns since the location of the vertex which is not at one or the other end of the long side is different due to the difference in angle.

Figure 6A:
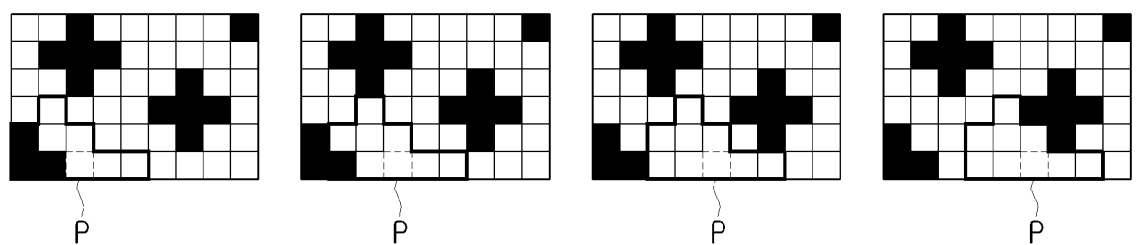
FIGS. 6A and 6B illustrate an operation of a filter unit according to an exemplary embodiment of the present general inventive concept.
Figure 6B:
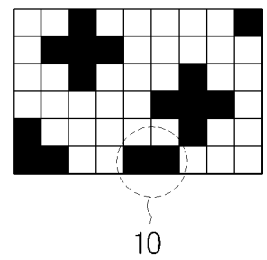

FIGS. 6A and 6B illustrate the filtering operation and results of the filter unit 122 by applying the fourth pattern D' of FIG. 4B. As illustrated in FIG. 6A, the edge pixels P are filtered in sequence by applying the filtering pattern D' to the detected edge area and sequentially moving the filtering pattern D' in the detected edge area. A filtering value corresponds to a number of white pixels in the filtering area.

Determination of whether to add a dot to the location of each edge pixel according to the filtering value can be described with reference to the following Table 2.

TABLE 2

| | Location of edge pixel | | | |
|---|---|---|---|---|
| | P(x − 1) | P(x − 0) | P(x + 1) | P(x + 2) |
| Filtering value | 6*255 = 1530 | 8*255 = 2040 | 9*255 = 2295 | 9*255 = 2295 |
| Reference value | 8*255 = 2040 | 8*255 = 2040 | 8*255 = 2040 | 8*255 = 2040 |
| Whether to add dot | x | x | ○ | ○ |

In Table 2, if the second filtering location is defined as P(x) and if filtering is performed in sequence from P(x−1), the filtering value of P(x−1) is a value obtained by multiplying 6, which is the number of white pixels in the filtering area, by $2^8$, which is the gradation value. That is, when a filtering pattern of 5*5 size is applied to a 5*5 window, the filtering value is an output value obtained by performing convolution for the filtering pattern and a screened image in the window.

The control unit 123 adds a dot to the current pixel P to which the filtering pattern is applied if the filtering value of the filter unit 122 is higher than a reference value. The control unit 123 outputs a pixel value of the screened image corresponding to an edge pixel if the filtering value of the filter unit 122 is lower than a reference value. The reference value may be determined according to pixel density of the input image and a slope of edge pixels.

As a result of filtering the edge area of FIG. 5A, dots are added to P(x+1) and P(x+2). FIG. 6B illustrates an edge area to which dots 10 are added after comparing the filtering value for the location P of each edge pixel with the reference value.

The control unit 123 determines the pixel density of the added dot according to whether a background of an edge pixel is white, and an edge direction. As a result, the added dots can be expressed smoothly. The background refers to a background of an image.

Figure 7A:
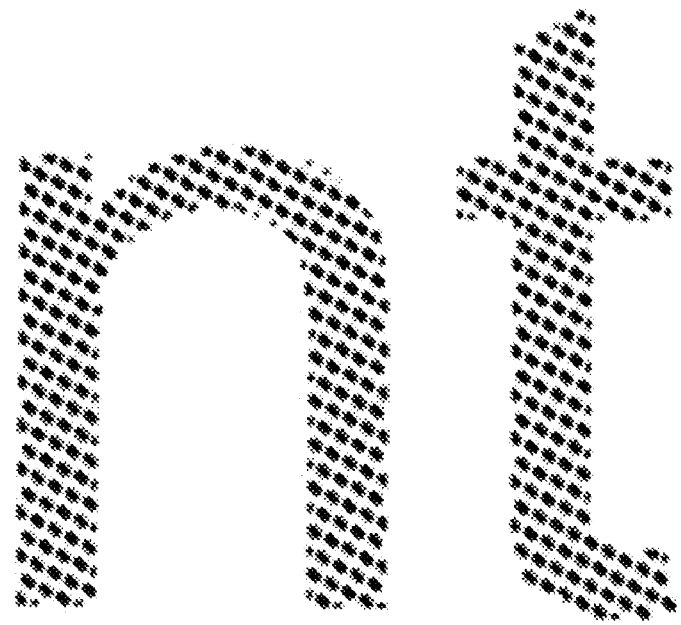
FIGS. 7A and 7B illustrate results of halftone revision according to an exemplary embodiment of the present general inventive concept.
Figure 7B:
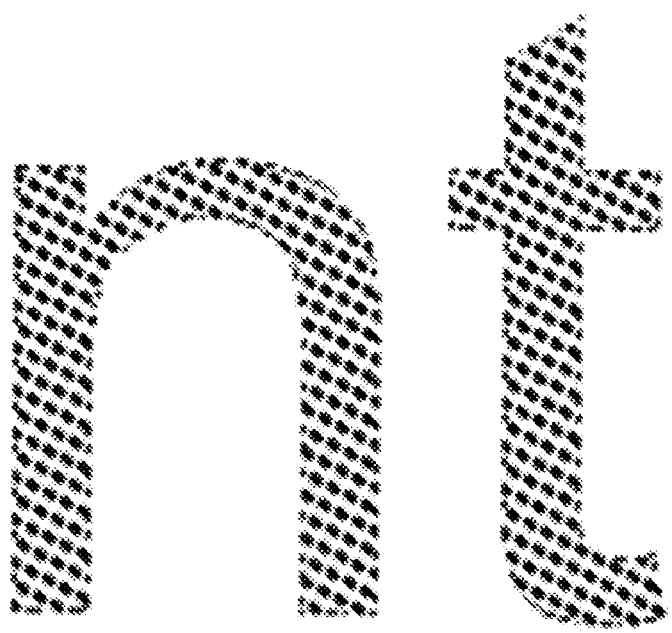

FIG. 7A illustrate the screening results before performing halftone revision, and 7B illustrate the results of halftone revision. Edges have improved by a filtering pattern being applied according to an edge direction of an edge pixel and screening information to an edge area, as illustrated in FIG. 7B.

Figure 8:
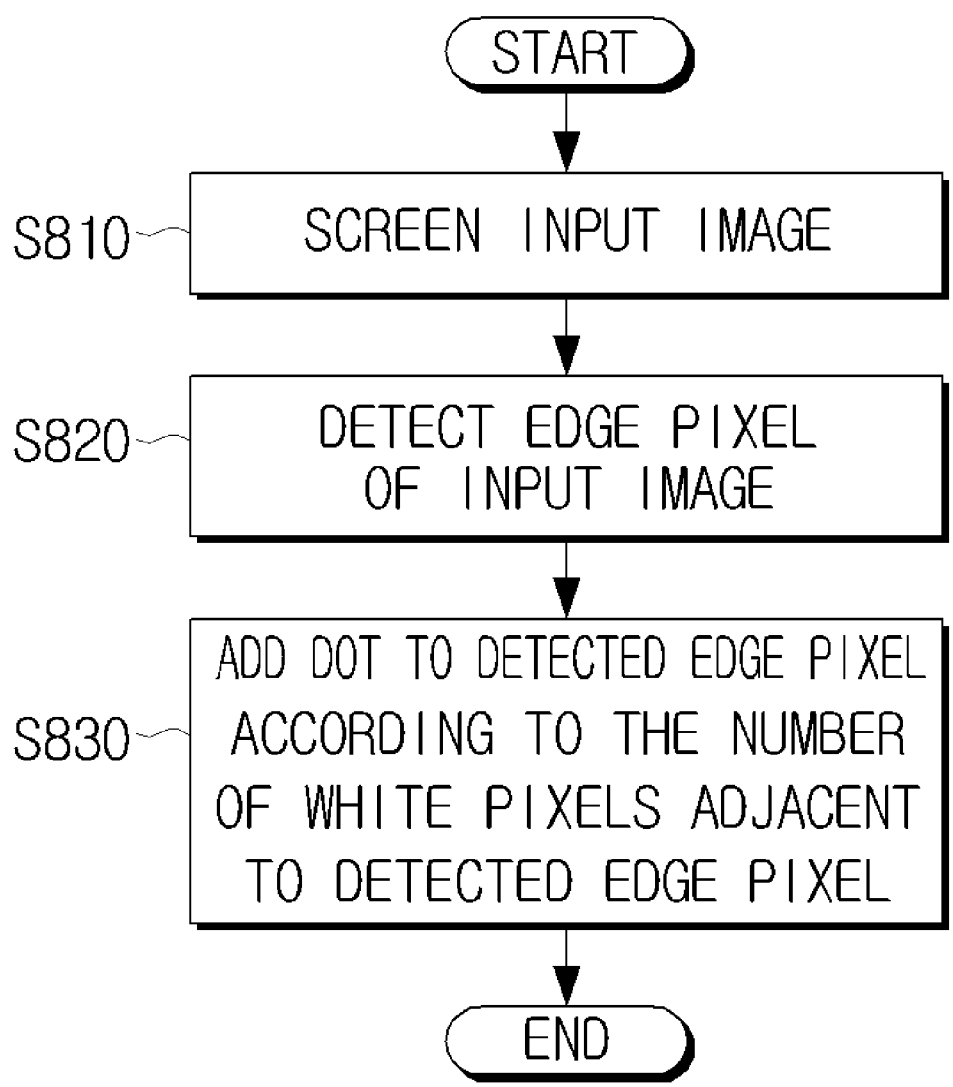
FIG. 8 is a flowchart illustrating a halftone revision method of a halftone revision apparatus according to an exemplary embodiment of the present general inventive concept.

FIG. 8 is a flowchart illustrating a halftone revision method of a halftone revision apparatus according to an exemplary embodiment of the present general inventive concept. As illustrated in FIG. 8, an input image is screened according to preset screen information (operation S810).

Edge pixels constituting an edge area of the input image are detected (operation S820), and the edge area is revised by adding a dot to a detected edge pixel according to the number of white pixels adjacent to the detected edge pixel (operation S830). Halftone revision is performed only in the edge area of the input image.

Therefore, the edge area of the image can be printed more smoothly.

Figure 9:
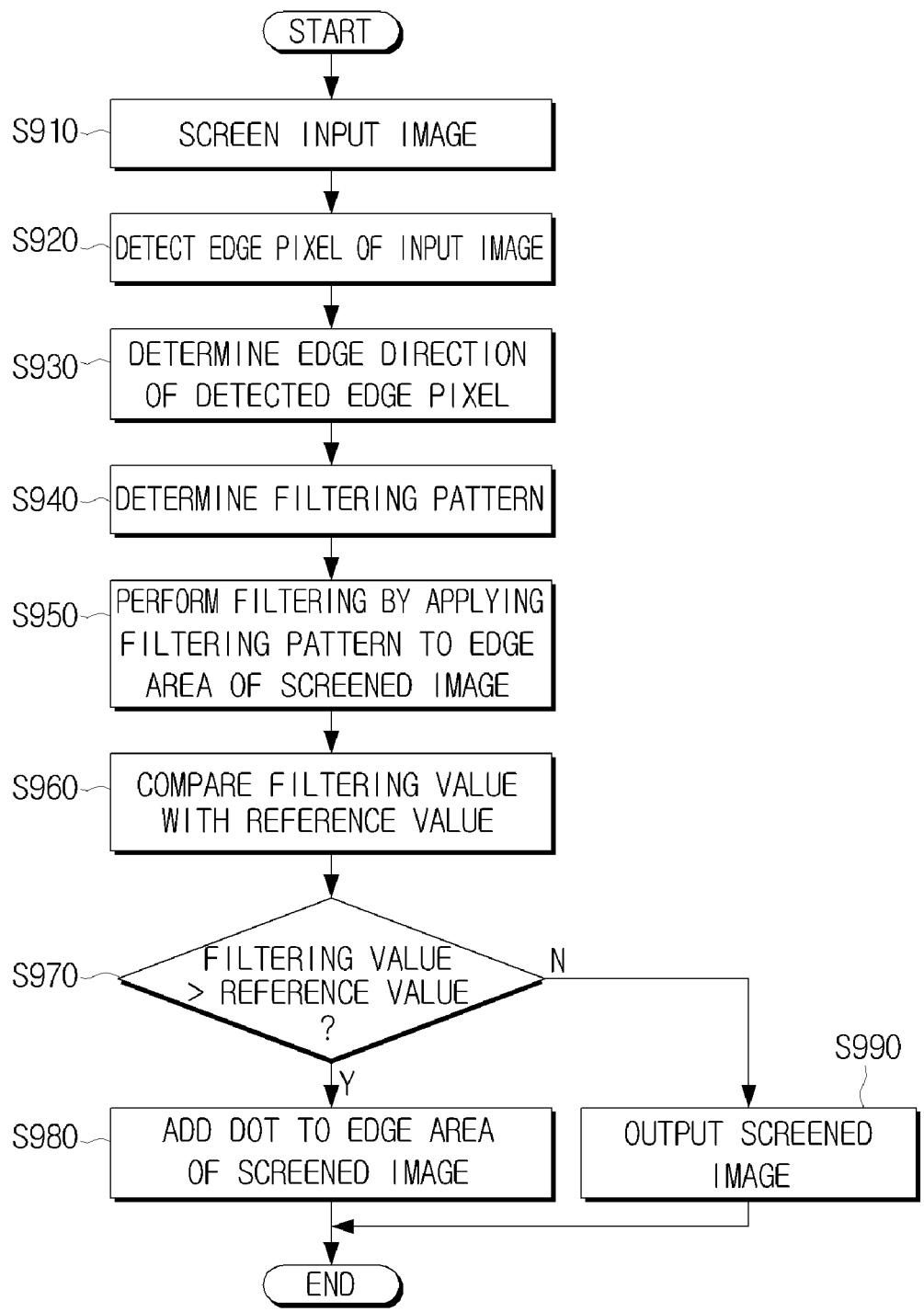
FIG. 9 is a flowchart illustrating the halftone revision method of FIG. 8 in greater detail.

FIG. 9 is a flowchart illustrating the halftone revision method of FIG. 8 in greater detail. As illustrated in FIG. 9, an input image is screened according to preset screen information (operation S910), and edge pixels constituting an edge area of the input image are detected (S920).

Edge pixels can be detected by generating a blurred gray image of the input image using a Gaussian filter, and calculating the generated gray image using an edge detection algorithm such as a Sobel mask, which is well-known to those skilled in the art.

Subsequently, an edge direction of the detected edge pixel is determined (operation S930). An edge direction can be determined according to the density change direction of the edge pixel and the correlation direction of the edge pixel in respect to the input image.

A density change direction of the edge pixel may be defined as the direction from a low density to a high density, or the direction from a high density to a low density. A correlation direction of the edge pixel in respect to the input image may be one of a horizontal direction, a vertical direction, and an oblique direction. An edge direction can be defined as in the above Table 1 by combination of two such conditions.

Subsequently, a filtering pattern is determined based on the determined edge direction and the screening information (operation S940). In greater detail, a size of a filtering pattern may be inversely proportional to an LPI value, and a filtering pattern may be a triangular filtering pattern in which two sides form an angle equal to the angle of the screen, and one vertex is in the direction of the edge direction. The screening information may be the LPI and the angle of the screen.

If the filtering pattern is determined, filtering is performed by applying the filtering pattern to the edge area of the screened image (operation S950). Next, whether to add a dot to the edge area is determined by comparing a filtering value and a preset reference value (operation S960).

If the filtering value is higher than the reference value (operation S970), a dot is added to the edge area of the screened image (operation S980). Alternatively, if the filtering value is lower than the reference value (operation S970), the respective screened image is printed (operation S990).

Figure 10:
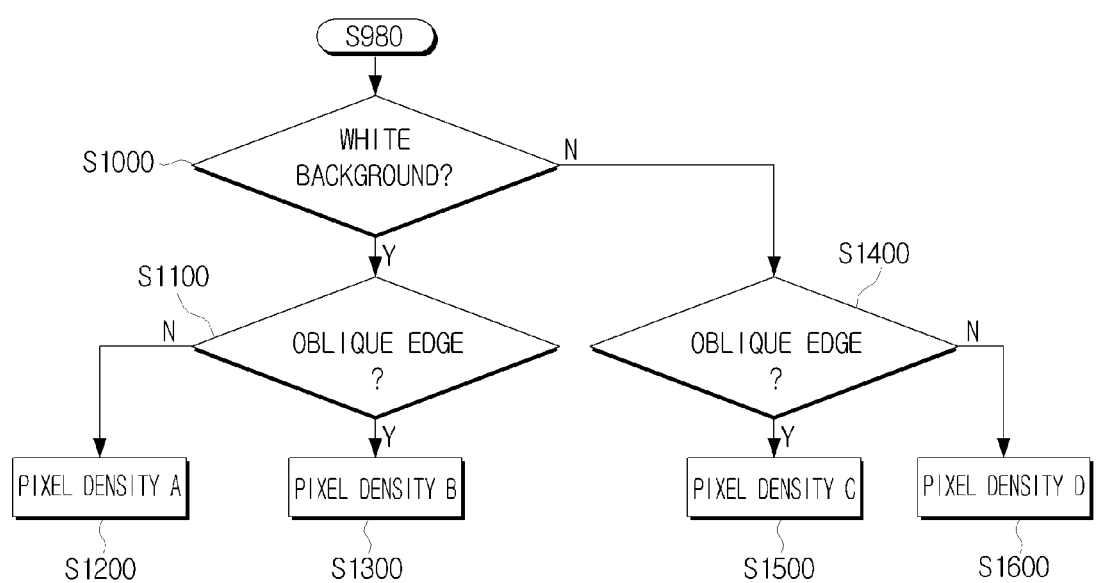
FIG. 10 is a flowchart illustrating a method to determine pixel density of an added dot according to an exemplary embodiment of the present general inventive concept.

FIG. 10 is a flowchart illustrating a method to determine the pixel density of an added dot according to an exemplary embodiment of the present general inventive concept. As illustrated in FIG. 10, if a background of an edge area of an image is white (operation S1000:Y) and if the edge is a horizontal edge or a vertical edge (operation S1100:N), a dot of pixel density A is added (operation S1200).

If the background of an edge area of an image is white (operation S1000:Y) and if the edge is an edge of an oblique direction (operation S1100:Y), a dot of pixel density B is added (operation S1300).

If the background of an edge area of an image has a certain gradation value (operation S1000:N) and if the edge is an oblique edge (operation S1400:Y), a dot of pixel density C is added (operation S1500).

If the background of an edge area of an image has a certain gradation value (operation S1000:N) and if the edge is a horizontal edge or a vertical edge (operation S1400:N), a dot of pixel density D is added (operation S1600).

The pixel density satisfies A>B≧C>D, and a pixel value can be set according to a user's customization. Consequently, the background and the image can be more clearly distinguished, resulting in an improved boundary.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A halftone revision apparatus, comprising:
a screening unit to screen an input image; and
a revision unit to detect edge pixels in the input image, and to add a dot to a detected edge pixel according to a number of white pixels adjacent to the detected edge pixel.

2. The halftone revision apparatus of claim 1, wherein the revision unit comprises:
an edge determination unit to detect the edge pixels in the input image, and to determine an edge direction of the detected edge pixel;
a filter unit to output a filtering value corresponding to a number of white pixels adjacent to the edge pixel by applying a filtering pattern corresponding to screening information of the screening unit and the edge direction to the edge pixel; and
a control unit to add the dot to the edge pixel according to the filtering value.

3. The halftone revision apparatus of claim 2, wherein the control unit compares the filtering value of the filter unit with a preset reference value, and if the filtering value is higher than the reference value, adds the dot to a location to which the filtering pattern is currently applied.

4. The halftone revision apparatus of claim 2, wherein the control unit compares the filtering value of the filter unit with a preset reference value, and if the filtering value is lower than the reference value, outputs a pixel value corresponding to the edge pixel.

5. The halftone revision apparatus of claim 3, wherein the reference value is determined according to a pixel density of the input image and a slant of the edge pixels.

6. The halftone revision apparatus of claim 2, wherein the control unit determines a pixel density of the added dot according to whether a background of the edge pixel is white, and an edge direction.

7. The halftone revision apparatus of claim 2, wherein the screening information comprises:
- a line-per-inch (LPI) value; and
- an angle of a screen.

8. A halftone revision method, comprising:
- screening an input image; and
- detecting edge pixels in the input image, and adding a dot to a detected edge pixel according to a number of white pixels adjacent to the detected edge pixel.

9. The halftone revision method of claim 8, wherein the detecting and adding operation comprises:
- detecting the edge pixels in the input image, and determining an edge direction of the detected edge pixel;
- outputting a filtering value corresponding to a number of white pixels adjacent to the edge pixel by applying a filtering pattern corresponding to screening information and the edge direction to the edge pixel; and
- adding the dot to the edge pixel according to the filtering value.

10. The halftone revision method of claim 9, wherein in the adding operation, the filtering value is compared with a preset reference value, and if the filtering value is higher than the reference value, the dot is added to a location to which the filtering pattern is currently applied.

11. The halftone revision method of claim 9, wherein in the adding operation, the filtering value is compared with a preset reference value, and if the filtering value is lower than the reference value, the pixel value corresponding to the edge pixel is output.

12. The halftone revision method of claim 10, wherein the reference value is determined according to a pixel density of the input image and a slant of the edge pixels.

13. The halftone revision method of claim 9, wherein the pixel density of the added dot is determined according to whether a background of the edge pixel is white, and an edge direction.

14. The halftone revision method of claim 9, wherein the screening information comprises:
- a lines-per-inch (LPI) value; and
- an angle of a screen.

15. A halftone revision method, comprising:
- determining a filtering pattern corresponding to screening information of an input image and an edge direction in the input image; and
- performing filtering by applying the filtering pattern to an edge pixel in the input image.

16. The halftone revision method of claim 15, wherein the screening information comprises:
- a lines-per-inch (LPI) value and an angle of a screen, and in the determining operation, a triangular filtering pattern is determined, a size of which is inversely proportional to the LPI value and in which two sides form an angle corresponding to the angle, and one vertex is in the direction of the edge direction.

17. The halftone revision method of claim 15, further comprising:
- adding a dot to the edge pixel according to the filtering result.

18. An image forming apparatus, comprising:
- an image processing unit to screen an input image, to detect edge pixels constituting an edge area of in the input image, and to add a dot to the detected edge pixel of the edge area of the screened input image according to a number of predetermined pixels adjacent to the detected edge pixel; and
- a printing unit to print the image having the edge area to which the dot is added.

19. The image forming apparatus of claim 18, wherein the image processing unit comprises:
- an edge determination unit to detect the edge pixels constituting the edge area of the input image, and to determine an edge direction of the detected edge pixel;
- a filter unit to output a filtering value corresponding to a number of the white pixels adjacent to the edge pixel by applying a filtering pattern corresponding to screening information of the screening unit and the edge direction to the edge pixel; and
- a control unit to add the dot to the edge pixel according to the filtering value.

20. The image forming apparatus of claim 19, wherein the screening information comprises:
- a lines-per-inch (LPI) value; and
- an angle of a screen.

21. A non-transitory computer-readable recording medium having embodied thereon a computer program to execute a method, wherein the method comprises:
- screening an input image; and
- detecting edge pixels in the input image, and adding a dot to a detected edge pixel according to a number of white pixels adjacent to the detected edge pixel.

* * * * *